J. M. DODGE.

Assignor, by Mesne Assignments, to A. H. & H. L. ANDREWS.

STOP HINGE.

No. 10,637. Reissued Aug. 18, 1885.

Witnesses.
Jas. E. Hutchinson.
J. A. Rutherford

Inventor
James M. Dodge,
By West & Bond
Att'ys.

N. PETERS. Photo-Lithographer, Washington, D. C.

UNITED STATES PATENT OFFICE.

JAMES M. DODGE, OF CHICAGO, ILLINOIS, ASSIGNOR, BY MESNE ASSIGNMENTS, TO ALFRED H. ANDREWS AND HERBERT L. ANDREWS, OF SAME PLACE.

STOP-HINGE.

SPECIFICATION forming part of Reissued Letters Patent No. 10,637, dated August 18, 1885.

Original No. 221,290, dated November 4, 1879. Application for reissue filed January 9, 1880.

DIVISION A.

*To all whom it may concern:*

Be it known that I, JAMES M. DODGE, of Chicago, county of Cook, and State of Illinois, formerly of the city, county, and State of New York, have invented a new and useful Improvement in Stop-Hinges, which is fully described in the following specification, reference being had to the accompanying drawings, in which—

Figure 1:
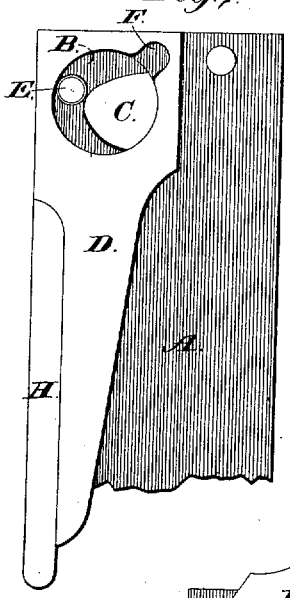
Figure 3:
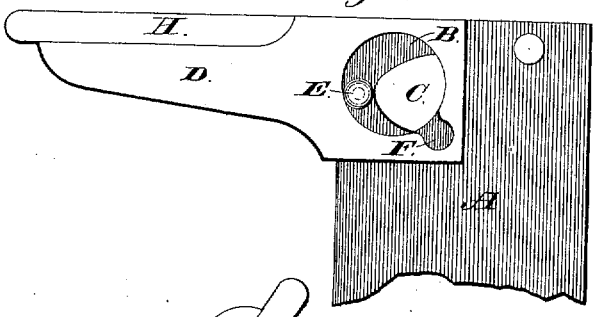
Figure 2:
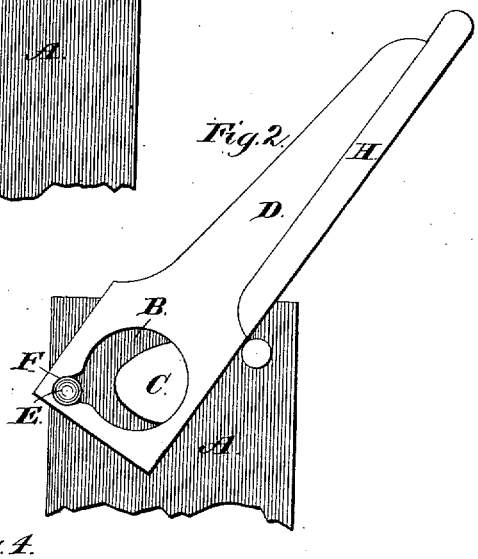
Figure 4:
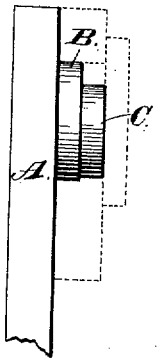
Figure 5:
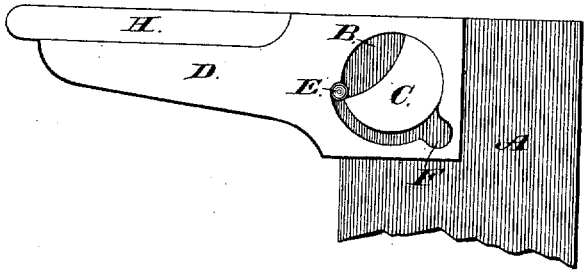

Figure 1 represents a side elevation of a part of a desk with my improved hinge applied, the movable part of the hinge and the desk-top being lowered; Fig. 2, a similar view with the top elevated to its highest position; Fig. 3, a similar view with the top stopped in proper position for a desk; Fig. 4, a front elevation of the same, showing the two parts of the hinge; and Fig. 5, a side elevation showing another form which is made the subject-matter of a separate division of this reissue.

My invention relates to a hinge for desks and other articles in which one part is movable and it is desired to stop the movable part at certain points.

Heretofore stop-hinges have been made by providing for sufficient play on a pivot to permit the movable part of the hinge to be lifted over projections on the fixed part which would otherwise arrest its motion. This kind of hinge is objectionable, for the reason that the entire weight of the movable section to which the movable part of the hinge is attached must be lifted over the projections in order to disengage the stop and permit the further movement of the hinged section, and also on account of the noise occasioned by the play of the two parts of the hinge when operated.

The object of my invention is to provide a hinge in which the movable part may be stopped and held in the position desired and released by simply turning the movable member in the proper direction without lifting and without noise in its operation.

My invention consists in a pintle and knuckle of peculiar construction, in combination with a loose ball which operates to stop the movable part of the hinge at the desired point, all of which will be hereinafter more fully described, and pointed out particularly in the claims.

In the drawings I have represented the hinge applied to a school-desk the top or lid of which is intended to be hinged to the upright portion, so as to be raised and lowered.

In these drawings, A represents one of the standards or end pieces of the desk, and B the stud or pintle of the hinge which is fixed to the standard. The inner portion of the pintle is round, as shown in Fig. 4 of the drawings; but the outer face is cut away somewhat nearly around the pintle, so as to provide an irregular or cam shaped portion, C, as shown in the drawings.

The movable part D of the hinge is provided with a knuckle or socket, which is fitted to receive the stud or pintle B, and is closed so as to cover the face of the pintle. It is evident, therefore, that a passage will be formed around the inner edge of the cam C between the cut-away portion of the pintle and the knuckle. A loose ball, E, is placed in this passage or vacant space between the knuckle and pintle, and the cam C is of such shape that the opening or passage between it and the knuckle is constricted toward the lower portion of the cam and enlarged toward the upper portion thereof.

The ball E is larger than the lower portion of this space between the cam and knuckle, but smaller than the upper portion, so that when permitted to roll down within the lower portion of the space, as shown in Fig. 3 of the drawings, the ball will be jammed between the cam C and the knuckle, thereby stopping the movement of the knuckle around the pintle and securely holding it from dropping farther. At the same time the knuckle may be released simply by elevating it or turning it back, as the stop-ball will of course then roll up into the upper enlarged portion of the chamber.

In one side of the knuckle a pocket or recess, F, is made large enough to receive the stop-ball. When it is desired to drop the lid of the desk, it is first thrown up from the position shown in Fig. 3 of the drawings, thereby releasing the ball, which drops into the pocket F when the latter is brought around far enough in front by the upward vibration of the knuckle-piece D to permit the ball to fall into it. The knuckle-piece may now be turned downward, and the ball resting in the pocket will be carried backward and upward behind the cam-projection C, permitting the knuckle-piece D to drop into a vertical position, as shown in Fig. 1 of the drawings. When in this movement the pocket F is brought around above the upper portion of the cam C, so as to be again uncovered, as shown in Fig. 1 of the drawings, the ball will roll out of the pocket and down the incline of the cam until it rests again between the pintle-cam and the knuckle, so that whenever the knuckle-piece is again turned upward the ball will be in position to stop it from dropping again, as described above.

It will thus be seen that a stop is provided for the hinge which requires no lifting, all of the parts being operated by turning the movable part of the hinge upon its pintle in the ordinary way—that is, always in the same plane. The construction is very simple and not liable to derangement, and as the wall is inclosed, and therefore protected from dirt, the wear is very slight.

In applying this hinge to desks the lid or top H is fastened to the socket or knuckle pieces D, so as to rise and fall with them. The standards or end pieces may also be provided with suitable stops to arrest the upward movement of the lid and hold it in an elevated position, as shown in Fig. 2 of the drawings, if desired.

Modifications may be made in the construction of the two parts of the hinge. The pintle may have only a groove in its end piece, through which the ball may pass from its elevated position to its lower or working position; or this passage may be a hole drilled through the body of the pintle, the arrangement of the pocket in the socket or knuckle being arranged to correspond. The socket or knuckle may also have one or more pockets arranged in different ways to take the stop-piece in different positions.

Instead of the sphere shown, a cylindrical stop-piece may be employed, or an oval-shaped piece will operate in practice, though I prefer the spherical form, as with it there is less friction and the movement is more free. It is only necessary in the construction of the hinge to provide for the jamming of the stop-ball between the movable and fixed parts at the point where it is desired to stop the hinge, to provide a pocket or recess in the movable part in which the ball may be taken from its working position and carried around therein as the movable part drops, and to provide a passage in the pintle or fixed part along which the ball may pass from its elevated position to its working position by the action of gravity. Whenever these conditions are obtained, the principle of my invention will be incorporated. I do not, therefore, confine myself to the precise construction of parts herein described and shown, for it is evident that my improvement may be applied not only to desks, but to many other articles in which there is a vibration of one or more parts in a vertical or substantially vertical direction, and in applying the invention to various articles it will be found necessary to change the form and construction of the parts to adapt them to the special locations in which they are placed and the particular result which it is desired to obtain. These changes may be readily made, however, and still retain the simplicity, durability, and cheapness of the hinge.

What I claim is—

1. In a stop-hinge, a pintle provided with a passage leading from the upper to the lower side thereof and a knuckle or socket piece, the two parts constructed to provide a constricted or cam opening between them, and the knuckle having an enlarged side pocket or recess, in combination with a loose stop-ball larger than the cam-opening, whereby the two parts of the hinge are stopped at the point desired by the ball caught in the cam opening and released by raising the knuckle-piece to permit the ball to drop into the side pocket, in which it is carried round and dropped into the upper end of the pintle-passage by lowering the knuckle-piece, substantially as described.

2. The pintle B, having a transverse groove or passage, in combination with the movable knuckle or socket D, provided with a pocket, F, at the side of the socket, and the loose ball E, constructed and operating substantially as described.

JAMES M. DODGE.

Witnesses:
JNO. C. MACGREGOR,
L. A. BUNTING.